(12) United States Patent
Jones (10) Patent No.: US 8,676,022 B2
(45) Date of Patent: Mar. 18, 2014

(54) ADAPTER FOR FIBER OPTIC CONNECTORS

(75) Inventor: Ashley W. Jones, Denton, TX (US)

(73) Assignee: Corning Cable Systems LLC, Hickory, NC (US)

( * ) Notice: Subject to any disclaimer, the term of this patent is extended or adjusted under 35 U.S.C. 154(b) by 40 days.

(21) Appl. No.: 13/446,067

(22) Filed: Apr. 13, 2012

(65) Prior Publication Data

US 2013/0272671 A1    Oct. 17, 2013

(51) Int. Cl.
*G02B 6/00* (2006.01)
*G02B 6/36* (2006.01)

(52) U.S. Cl.
USPC .......................................... 385/139; 385/76

(58) Field of Classification Search
USPC .......................................... 385/76, 77, 139
See application file for complete search history.

(56) References Cited

U.S. PATENT DOCUMENTS

| | | | | |
|---|---|---|---|---|
| 6,634,796 B2 * | 10/2003 | de Jong et al. | ............... | 385/56 |
| 7,029,182 B2 * | 4/2006 | Ngo | ............... | 385/53 |
| 2012/0099822 A1 * | 4/2012 | Kuffel et al. | ............... | 385/78 |

FOREIGN PATENT DOCUMENTS

| | | | | |
|---|---|---|---|---|
| JP | 2005104395 A | 4/2005 | ............... | B60R 19/40 |
| JP | 2007162323 | 6/2007 | ............... | E21D 9/04 |
| JP | 2007175954 | 7/2007 | ............... | B41J 29/00 |
| KR | 883090 B1 | 1/2009 | ............... | G06Q 50/00 |

* cited by examiner

*Primary Examiner* — Omar Rojas (57) ABSTRACT

A fiber optic connector adapter includes a base, a cap, and an interlock between the base and cap. The base includes surfaces that define an exterior and an interior passage between front and rear openings on opposing sides of the base. The cap is fastened to the base over one of the openings and has a port for a fiber optic connector, which includes a major dimension and a minor dimension narrower than the major dimension. The port includes only a single keyway, which is defined by an interior groove on the side of the port defining the major dimension. The interlock positions and holds the cap with the port oriented in a standard polarity. The interlock is releaseable and reengageable. The cap is configured to be released from the base, rotated 180-degrees, and refastened to the base, via the interlock. The keyway then has a reverse polarity.

20 Claims, 12 Drawing Sheets

FIG. 15 ously configured for one or the other polarity, without provisions to reverse the polarity of such adapters.

ADAPTER FOR FIBER OPTIC CONNECTORS

BACKGROUND

Aspects of the present disclosure relate generally to fiber optic cable assemblies, and more specifically to an adapter for coupling fiber optic connectors, such as two multi-fiber termination push-on (MTP) type fiber optic connectors.

An MTP connector, such as an MTP UniCam® Connector, is a standard fiber optic connection form factor, which is described by Fiber Optic Connector Intermateability Standards (FOCIS) Electronic Industries Alliance (EIA) specification EIA-604-5A-2001. The standard industry specification layout of an MTP adapter, for connecting together two MTP connectors, includes a keyway and a dust cap. The keyway engages a key integrated with the MTP connector to facilitate a proper orientation of the MTP connector when coupled to the adapter. The dust cap protects the MTP connector when engaged with the adapter, such as when a second connector has not yet been attached to the adapter.

In the field, such as in an operational data center, an operator or technician may want to reverse the polarity of two connected MTP connectors. With conventional MTP adapters, the keyway on one side of a standard MTP adapter can either be aligned with or opposed to the keyway on the other side of the adapter. When the keyways are aligned, then the mating connectors have a certain polarity. When the keyways are opposed, then the mating connectors have the reverse polarity.

Conventional MTP adapters are generally configured for one or the other polarity, without provisions to reverse the polarity of such adapters. As such, to reverse the polarity of the connection, the operator must remove the original adapter, acquire a reverse-polarity adapter, and re-connect the connectors with the reverse-polarity adapter, which may be a cumbersome process. A need exists for a way to easily and efficiently reverse the polarity of two coupled MTP connectors in the field.

SUMMARY

One embodiment relates to a fiber optic connector adapter that includes a base, a cap, and an interlock between the base and the cap. The base includes surfaces that define an exterior and an interior passage between front and rear openings on opposing sides of the base. The cap is fastened to the base over one of the front and rear openings. The cap has a port for a fiber optic connector defined therein. The port includes a major dimension extending along a first axis and a minor dimension extending along a second axis that is orthogonal to the first axis, where the minor dimension of the port is narrower than the major dimension. The port further includes only a single keyway, and the keyway is: (1) centered about the second axis on a side of the port defining the major dimension, (2) offset from the first axis in a first direction, and (3) defined by an interior groove on the side of the port defining the major dimension, where the interior groove extends in a direction orthogonal to the first and second axes and toward the passage of the base. The interlock, between the base and the cap, positions and holds the cap with the port of the cap oriented to interface with the passage of the base such that a fiber optic connector inserted into the port of the cap and guided by the keyway is directed to connect with a second fiber optic connector with the connection therebetween having a standard polarity. Additionally, the interlock, between the base and the cap, is releaseable and reengageable, and the cap is configured to be released from the base, rotated 180-degrees, and refastened to the base, via the interlock, where the keyway is then offset from the first axis in a second direction that is opposite to the first direction, which positions and holds the cap with the port of the cap oriented to interface with the passage of the base such that a fiber optic connector inserted into the port of the cap and guided by the keyway is directed to connect with a second fiber optic connector with the connection therebetween having a reverse polarity.

Another embodiment relates to hardware for management of fiber optic assemblies, which includes a panel and a gang of such fiber optic connector adapters fastened to the panel. The panel includes a planar surface for supporting the fiber optic assemblies, and guide walls extending orthogonally from the planar surface.

Yet another embodiment relates to a method of reversing the polarity of such a fiber optic connector adapter. The method includes a step of providing the fiber optic connector adapter, where the fiber optic connector adapter has a standard polarity. The method includes other steps of detaching the cap from the base and rotating the cap 180-degrees relative to the base. The method further includes a step of reengaging the cap with the base, where the fiber optic connector adapter then has a reverse polarity.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present invention is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
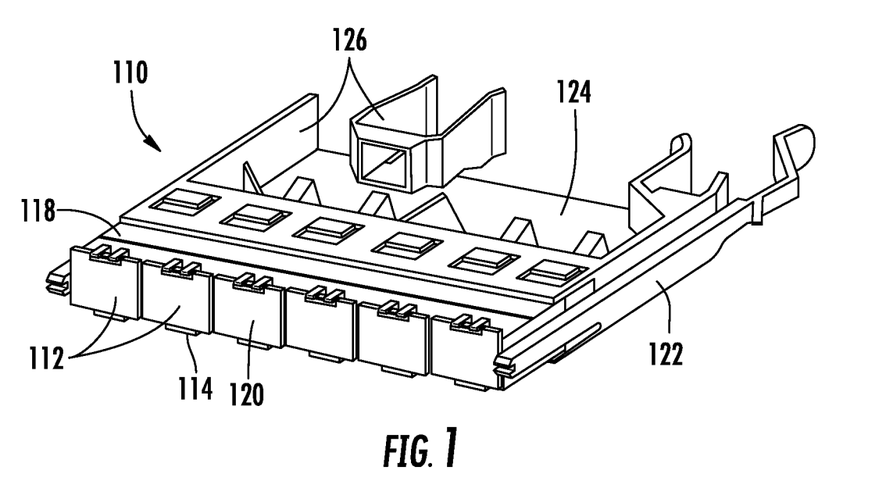
FIG. 1 is a perspective view of hardware including a ganged adapter module integrated with a connector panel according to an exemplary embodiment.

Referring to FIG. 1, hardware, such as hardware 110 for management and support of fiber optic assemblies in a data center or elsewhere, includes one or more fiber optic connector adapters 112. Fiber optic assemblies supported by the hardware 110 may include fiber optic cables, connectors (e.g., MTP connectors, SC connectors, LC connectors), furcation plugs, raceway guides, splitters, and other components. The fiber optic connector adapters 112 are configured to connect (e.g., align, mate) optical fibers of two compatible fiber optic connectors. In contemplated embodiments, technology disclosed herein, such as caps 114, 116, bases 118, shutters 120, other components and interactions therebetween, may be used with copper cable assemblies, composite copper and optical fiber cable assemblies, or other systems for data communication and/or power transfer.

According to an exemplary embodiment, the hardware 110 includes a panel 122 (e.g., shelf) having a planar surface 124 for supporting the fiber optic assemblies, such as fiber optic cables of the fiber optic assemblies. The panel 122 may be designed to mount into a larger cabinet or other assembly (not shown), which may contain servers and other hardware components.

Still referring to FIG. 1, the panel 122 includes guide walls 126 extending orthogonally from the planar surface 124. In some embodiments, the hardware 110 includes a gang of the fiber optic connector adapters 112 (e.g., set, plurality) fastened to the panel 122. For example, the gang of the fiber optic connector adapters 112 may include at least two, at least three, at least four, at least six, or other numbers of the fiber optic connector adapters 112 that are connected together, such as in a line or stack.

Figure 2:
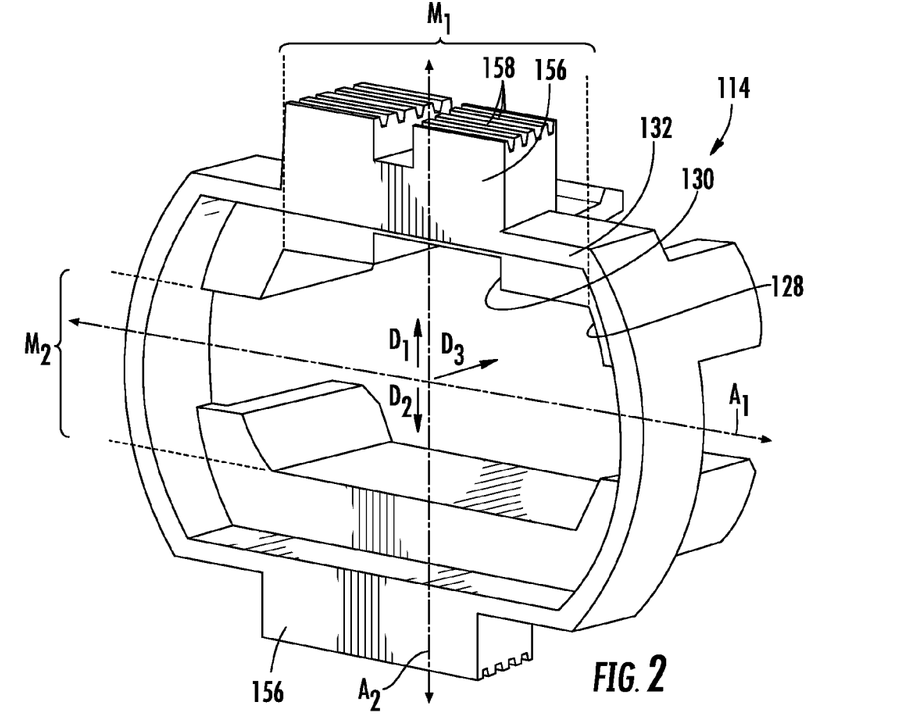
FIG. 2 is a perspective view of a field-installable, reversible cap for a fiber optic connector adapter according to an exemplary embodiment.
Figure 3:
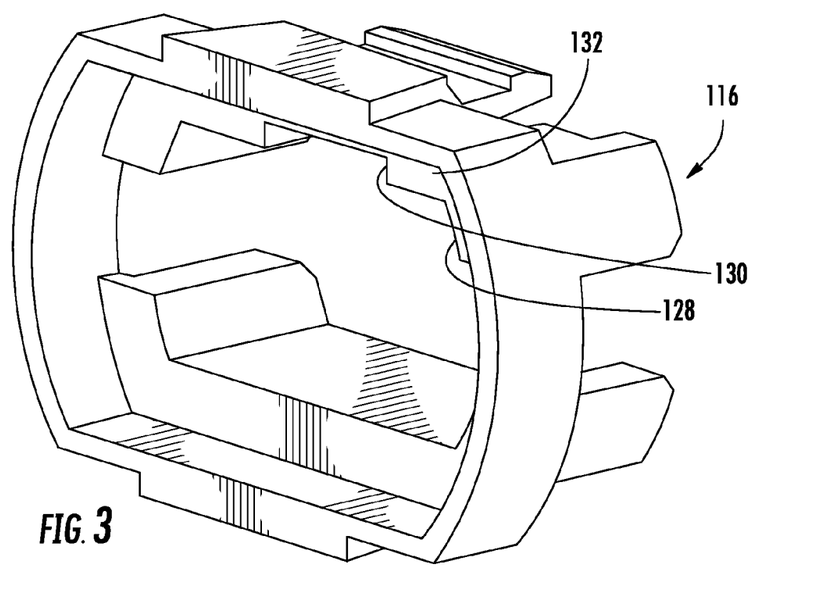
FIG. 3 is a perspective view of a fixed-polarity cap according to an exemplary embodiment.

Referring to FIGS. 1-5, the fiber optic connector adapters 112 include a base 118 (FIG. 4) and front and rear caps 114, 116 fastened to or otherwise integrated with the base 118. According to an exemplary embodiment, each cap 114, 116 is integrally formed from a polymeric material, such as molded plastic, and has a port 128 for a fiber optic connector, where the port 128 is defined by structure of the cap 114, 116, as shown in FIGS. 2-3. The port 128 includes a major dimension $M_1$ extending along a first axis $A_1$ and a minor dimension $M_2$ extending along a second axis $A_2$ that is orthogonal to the first axis $A_1$. According to an exemplary embodiment, the minor dimension $M_2$ of the port 128 is narrower than the major dimension $M_1$.

In some embodiments, the port 128, when the adapter 112 is fully assembled, includes only a single keyway 130. The keyway 130 is centered about the second axis $A_2$ on a side 132 of the port 128 defining the major dimension $M_1$, offset from the first axis $A_1$ in a first direction $D_1$, and defined by an interior groove (e.g., squared rectangular channel) on the side 132 of the port 128 defining the major dimension $M_1$. The interior groove of the keyway 130 extends in a direction $D_3$ orthogonal to the first and second axes $A_1$, $A_2$, and toward the base 118, when the adapter 112 is fully assembled.

In some such embodiments, the port 128 is particularly configured to receive (e.g., only properly receives) connectors corresponding to a standard fiber optic connection form factor, such as the form factor described by Fiber Optic Connector Intermateability Standards (FOCIS) Electronic Industries Alliance (EIA) specification EIA-604-5A-2001, incorporated by reference herein in its entirety. In other embodiments, the port 128 is configured to receive connectors corresponding to other form factors (e.g., SC-connectors, LC-connectors) or a combination of different form factors.

Figures 4, 5:
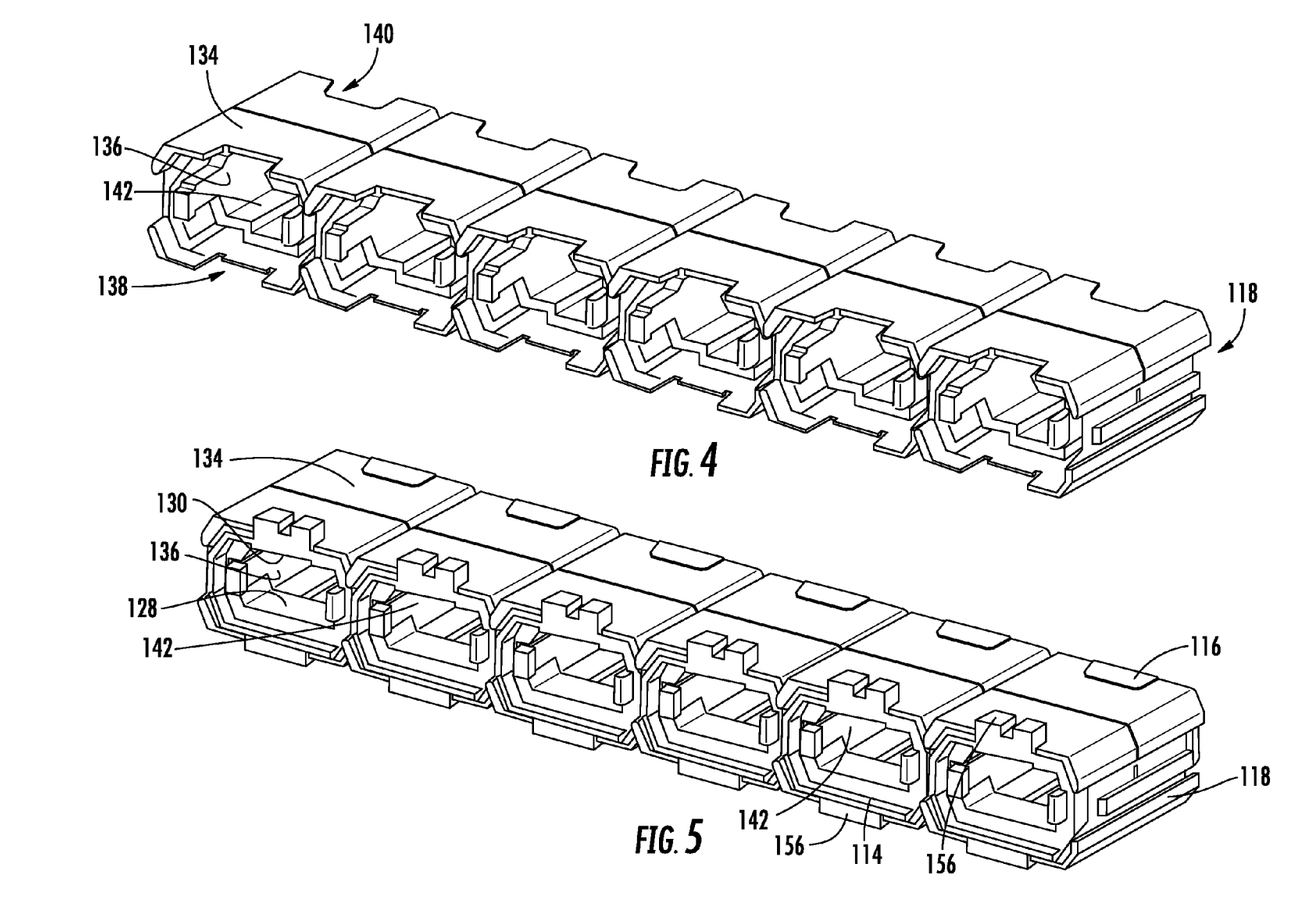
FIG. 4 is a perspective view of the ganged adapters of FIG. 1 without caps installed.
FIG. 5 is a perspective view of the ganged adapters of FIG. 4 with caps installed.

According to an exemplary embodiment, the base 118 includes surfaces (e.g., structure) that define an exterior 134 of the base 118 and an interior passage 136 between front and rear openings 138, 140 on opposing sides of the base 118, as shown in FIG. 4. When the adapter 112 is assembled, the cap 114 (FIG. 2) is fastened to the base 118 over one of the front and rear openings 138, 140, as shown in FIG. 5. The other cap 116 (FIG. 3) is fastened to the base 118 over the other of the front and rear openings 138, 140. In contemplated embodiments, the adapter 112 includes two caps 114 of the first type, as shown in FIG. 2, with one of the cap 114 replacing the cap 116 shown in FIG. 3.

In some embodiments, the base 118 corresponding to the fiber optic connector adapters 112 of the gang is or includes a single, solid component that is integrally formed from a polymeric material, such as molded plastic, that receives the caps 114, 116 of the adapters 112. The base 118 may further receive components in addition to the caps 114, 116, such as inserts 142, that facilitate attachment of the caps 114, 116 or otherwise facilitate assembly of the adapters 112.

According to an exemplary embodiment, the gang of fiber optic connector adapters 112 may be fastened to a front of the panel 122 (see FIG. 1) with the ports 128 of the caps 114, 116 orthogonal to the planar surface 124. In some embodiments, the base 118, including the gang of adapters 112, snapped into or otherwise fastened to the panel 122. In contemplated embodiments, the panel 122 and gang of adapters 112 may be a 1-by-6 ganged MTP adapter module for use with a Pretium EDGE® Solutions Module manufactured by CORNING CABLE SYSTEMS LLC.

Figure 6:
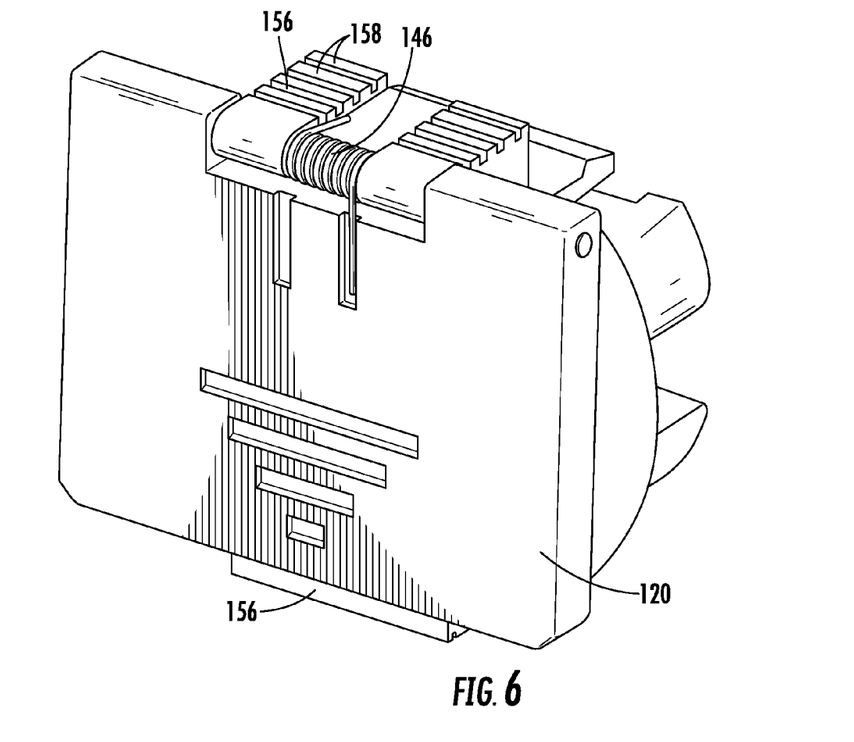
FIG. 6 is a perspective view of the cap of FIG. 2 with a shutter.
Figure 7:
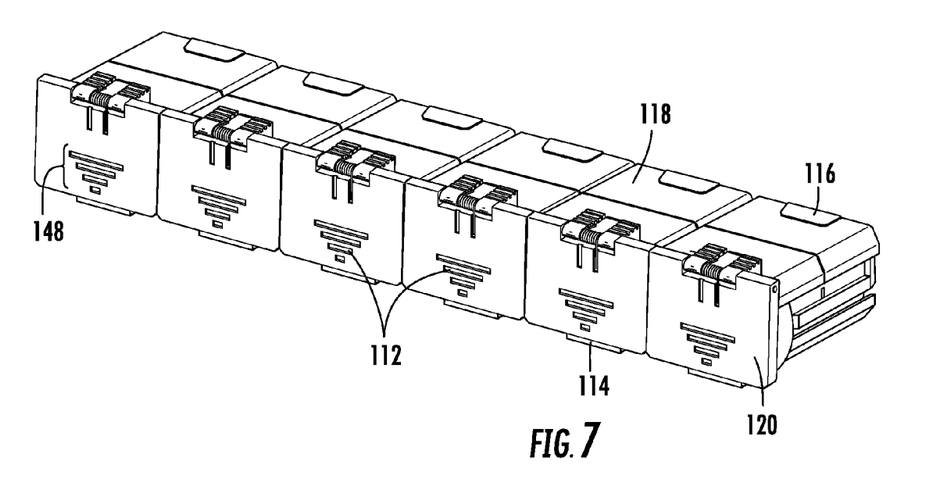
FIG. 7 is a perspective view of the ganged adapters of FIG. 5 with shutters.
Figure 8:
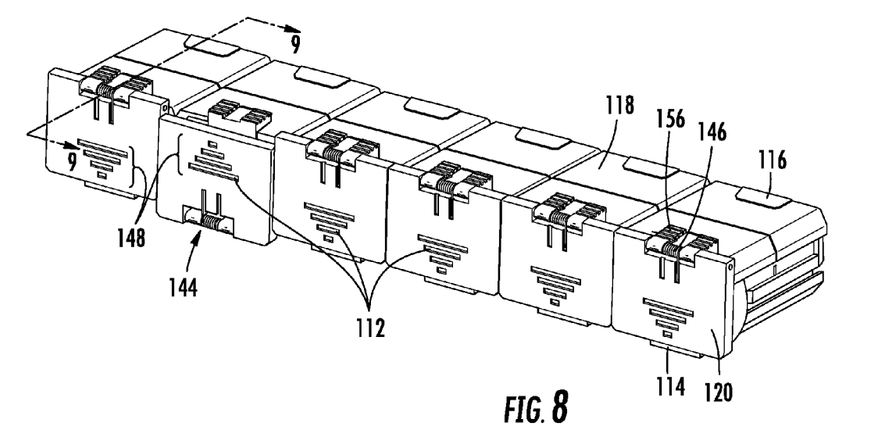
FIG. 8 is a perspective view of the ganged adapters of FIG. 7 with one adapter having a reverse polarity.
Figure 11:
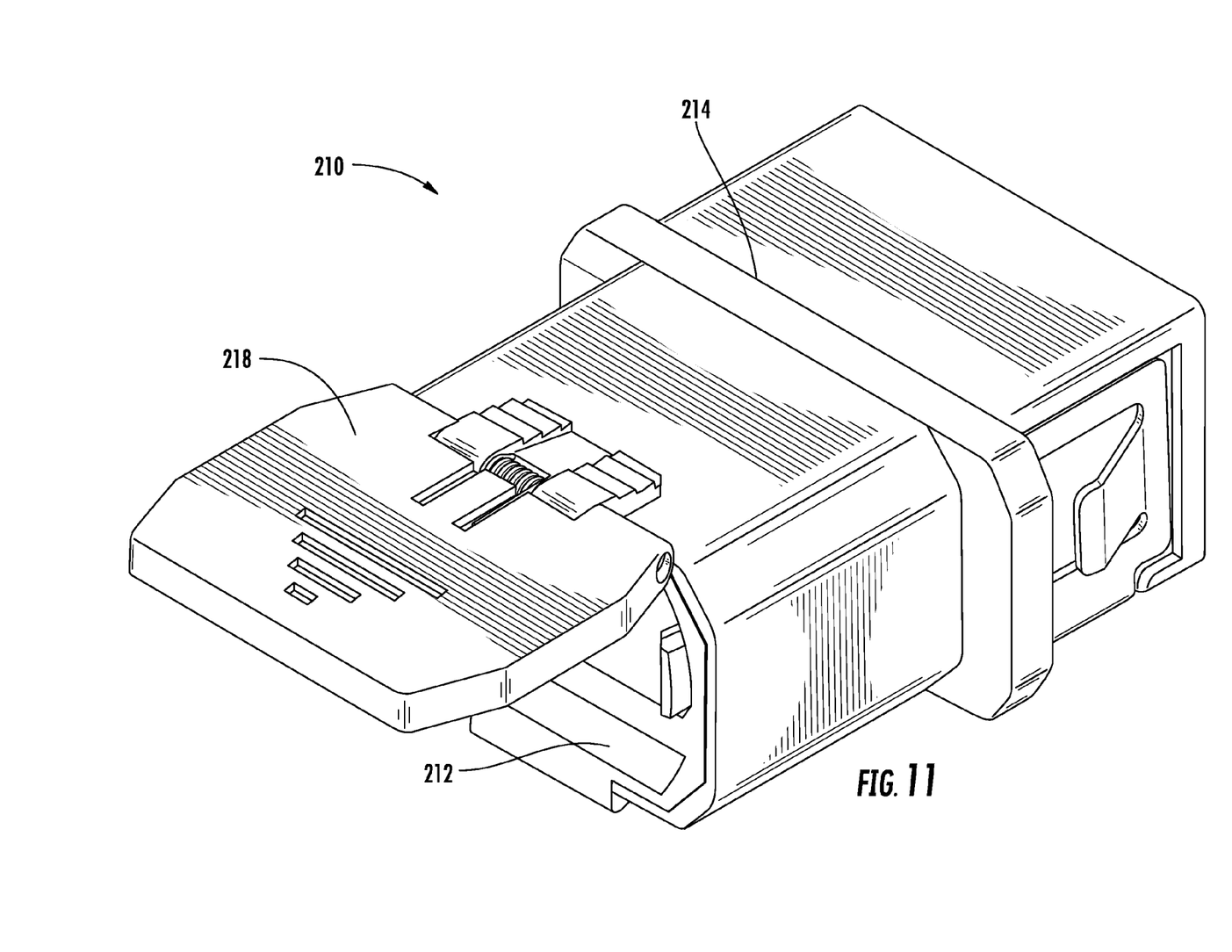
FIG. 11 is a perspective view of the adapter of FIG. 10 with the shutter open.
Figure 12:
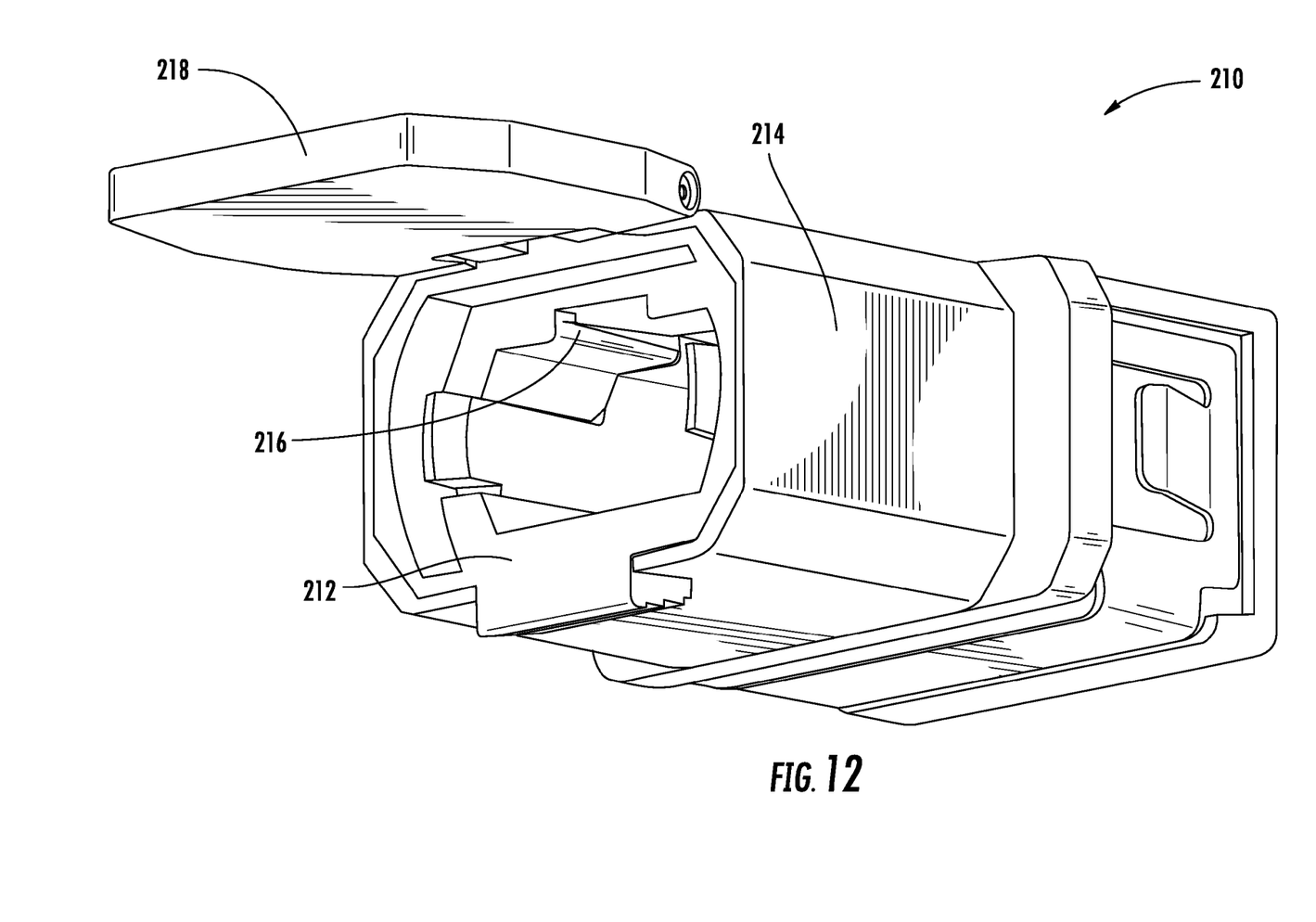
FIG. 12 is another perspective view of the adapter of FIG. 10 with the shutter open.
Figure 15:
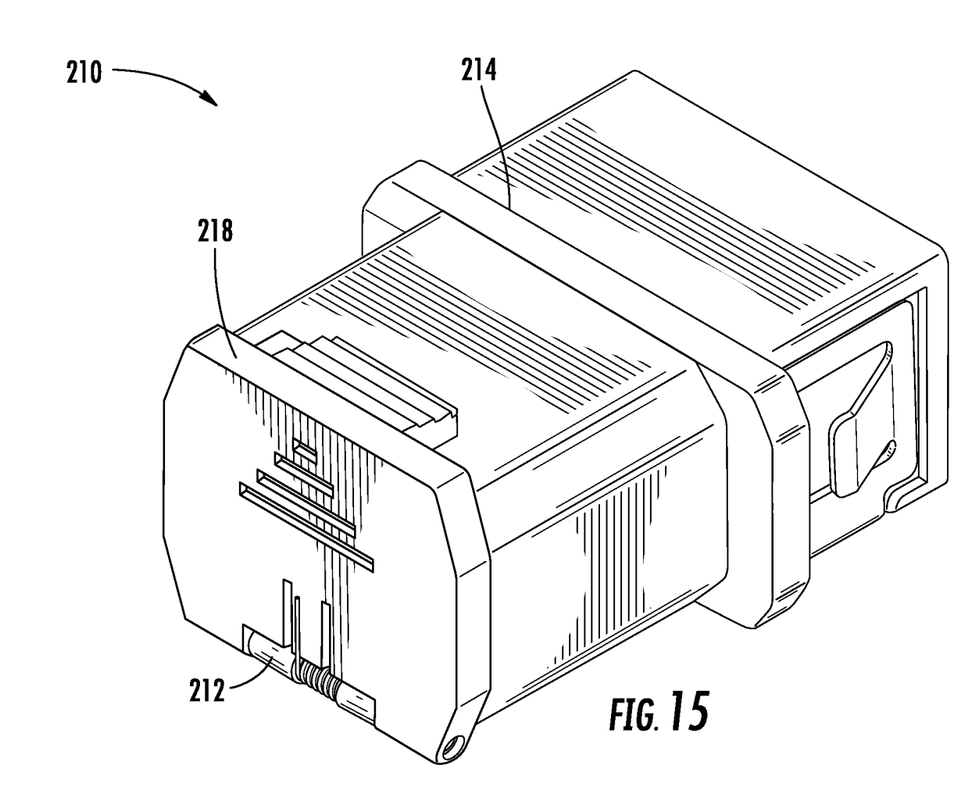
FIG. 15 is a perspective view of the adapter of FIG. 10 reconfigured with reverse polarity.
Figure 16:
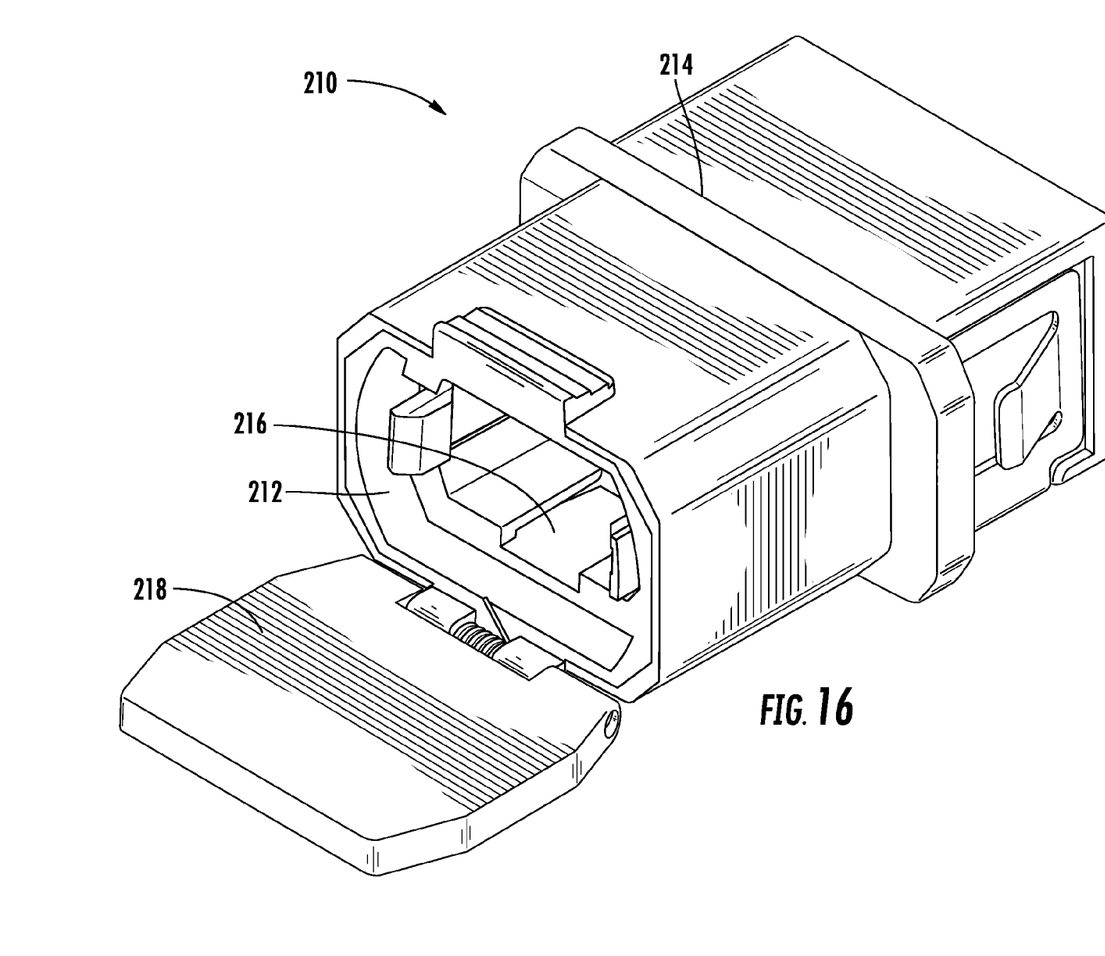
FIG. 16 is a perspective view of the adapter of FIG. 15 with the shutter open.

Referring to FIGS. 6-8, the cap 114 may have a shutter 120 attached thereto, such as for dust protection of a connector coupled to the adapter 112 by way of the other cap 116. According to an exemplary embodiment, the shutter 120 is pivotally coupled to the cap 114, where the shutter 120 in a closed-position blocks the port and in an open-position allows a connector access to the port 128 (see generally FIGS. 11-12 and 15). In other embodiments, the adapter 112 includes a removable dust cover, in place of the shutter 120.

In some embodiments, the shutter 120 is pinned to the cap 114 to form a hinge, and includes a torsion spring 146 that biases the shutter 120 to the closed position. In other contemplated embodiments, the shutter 120 may be integrally formed with the cap 114 and coupled thereto via a living hinge (i.e., thin strip of material integrally formed with and connecting the shutter 120 and cap 114 that readily folds to form a hinge).

Figure 9:
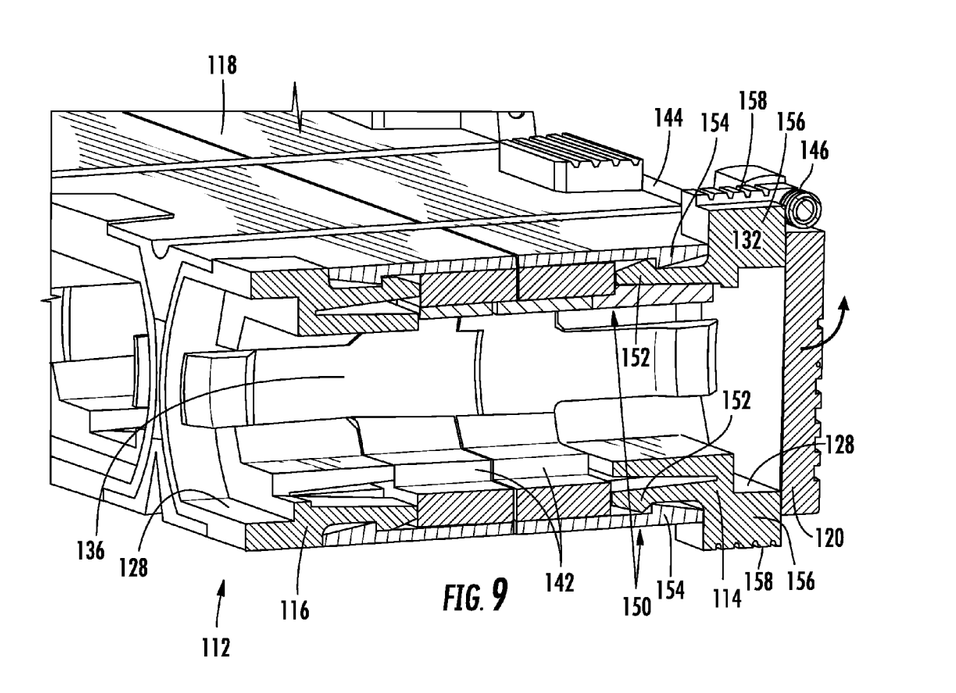
FIG. 9 is a sectional view of an adapter of FIG. 8 taken along line 9-9 as shown in FIG. 8.
Figure 10:
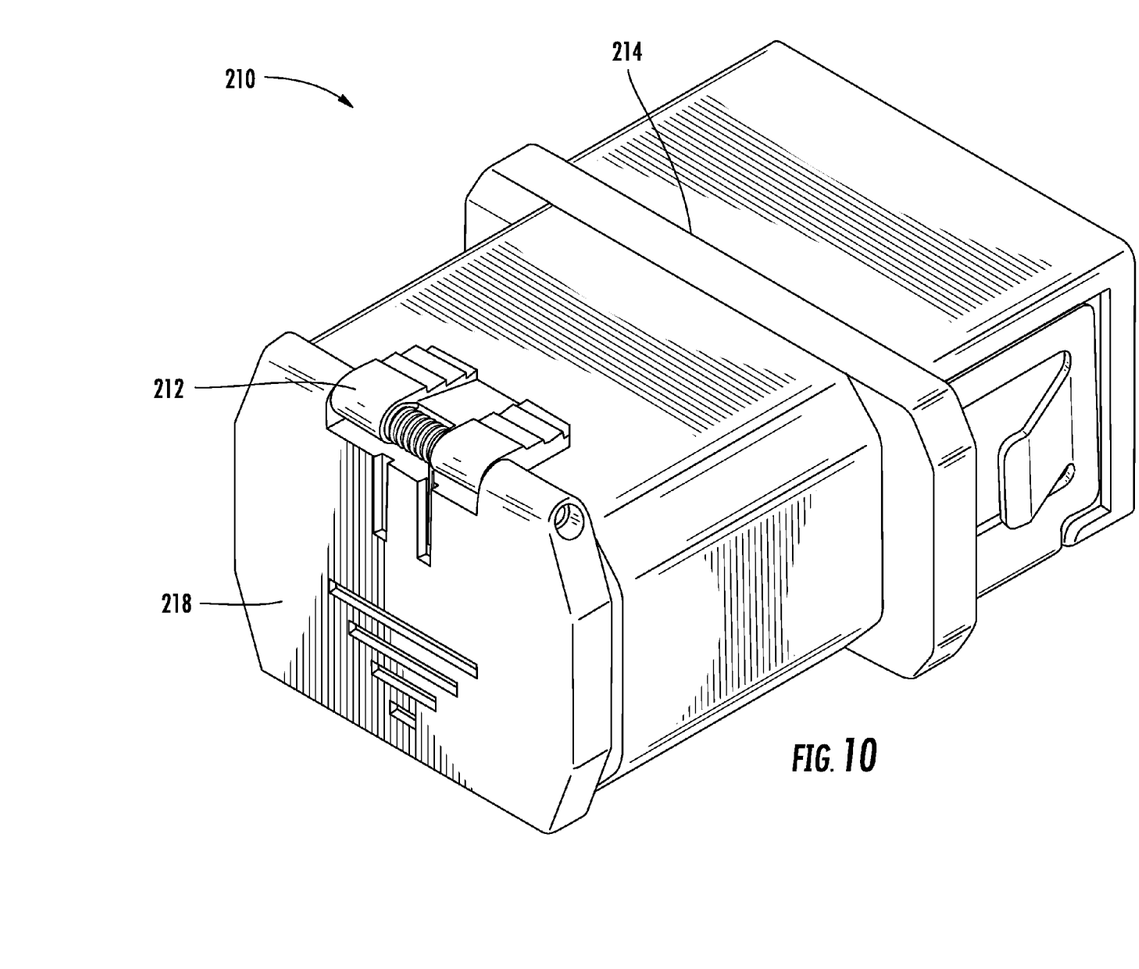
FIG. 10 is a perspective view of a fiber optic connector adapter according to another exemplary embodiment.

According to an exemplary embodiment, the shutter 120 for one polarity (e.g., standard polarity) is configured to open upward (see also FIG. 9). However, as shown in FIG. 8, the shutter 120 of the adapter cap 114, in a reversed-polarity mode, is flipped—oppositely oriented to a standard-polarity shutter 120, which provides a bold visual indication to the technician of the existence of the polarity flip. For example, as can be quickly and easily deduced from a brief visual inspection of the shutters 120 in FIG. 8, the adapter 144 has reversed polarity relative to the other adapters 112 of the gang.

In some embodiments, the shutter 120 is coupled to the cap 114 on the side 132 of the port 128 defining the major dimension $M_1$ and adjacent to the keyway 130, whereby the shutter 120 opens in opposite directions for the different polarities of the adapter 112 (e.g., opens up for one polarity and opens down for another), thereby providing an indication of the polarity of the respective adapter 112. The shutter 120 may further or otherwise include indicia 148, such as an arrow or another symbol, on a forward face of the shutter 120. According to an exemplary embodiment, the indicia 148 is asymmetric and the orientation of the indicia 148 corresponds with the polarity of the respective adapter 112, providing a bold visual indication to the technician of the current polarity of the respective adapter 112.

Referring to FIGS. 7-9 an interlock 150 (FIG. 9), between the base 118 and the cap 114, positions and holds the cap 114 in a configuration with the port 128 of the cap 114 oriented to interface with the passage 136 of the base 118 such that a fiber optic connector, inserted into the port 128 of the cap 114 and guided by the keyway 130, is directed to connect with a second fiber optic connector, with the connection having a particular polarity, such as a standard polarity (e.g., A-optical fiber of first connector to A-optical fiber of second connector and B-optical fiber of first connector to B-optical fiber of second connector).

For the cap 114 shown in FIG. 2, the interlock 150 between the base 118 and the cap 114 is releaseable and reengageable (e.g., selectively fastenable). Accordingly, the cap 114 is configured to be released from the base 118, rotated 180-degrees about the axis orthogonal to the first and second axes $A_1$, $A_2$, and refastened to the base 118 via the interlock 150 (see, e.g., adapter 144). When refastened, the keyway 130 is then offset from the first axis $A_1$ in a second direction $D_2$ that is opposite to the first direction $D_1$ (see FIG. 2). As such, once refastened, the interlock 150 again positions and holds the cap 114 with the port 128 of the cap 114 oriented in alignment with the passage 136 of the base 118. A fiber optic connector inserted into the reoriented port 128 of the cap 114 and guided by the keyway 130 is accordingly directed to connect with a second fiber optic connector, but with the connection therebetween having a reverse polarity (e.g., A-optical fiber of first connector to B-optical fiber of second connector and B-optical fiber of first connector to A-optical fiber of second connector).

Referring to FIG. 9, the passage 136 of the base 118 includes a female coupling and the cap 114 includes a male coupling configured to interlock with the female coupling to form the interlock 150. In some such embodiments, the cap 114 is fastened to the interior of the base 118. In alternate contemplated embodiments, the base 118 includes a male coupling and the cap 114 includes a female coupling, or both couplings are neither fully male or female.

According to an exemplary embodiment, the cap 114 of the adapter 112 snaps into the base 118 to form the interlock 150. In some such embodiments, if the cap 114 is manufactured with dual-chamfered snap features (see FIG. 9), then the cap 114 may be removed by hand (e.g., manually field reversible). Alternatively, the caps 114, 116 may be manufactured with a single chamfer snap feature for permanent polarity assignment or added security requiring a tool to facilitate removal of the cap 114 and reverse the polarity (e.g., not manually field reversible).

Referring to FIG. 9, the cap 114 includes hooks 152 and the base 118 includes flanges 154 within the passage 136, which together at least partially form the interlock 150. Chamfered surfaces on the forward, outside-exteriors of the hooks 154 are configured to contact the flanges 154. Upon insertion of the hooks 152 passing the flanges 154, the hooks 154 deflect inward and then recover outward once past the flanges 154 such that rear surfaces of the hooks 152 catch the flanges 154 to form the interlock. In other contemplated embodiments, the male and female couplings are threaded, pinned, latched, or otherwise connected together to form the interlock 150.

According to an exemplary embodiment, the cap further includes a protruding finger tab 156 (e.g., gripping surface), for the operator to hold the cap 114 when pulling the cap 114 out of the base 118 of the adapter 112. According to an exemplary embodiment the interlock 150 includes a hook 152 or chamfer forming a snap feature in conjunction with flanges 154, where the hook 152 deflects from the inside chamfer (e.g., ramp, reverse chamfer) of the hook 152 and the axial force from pulling on the cap 114, releasing the interlock 150. In some embodiments, the protruding finger tab 156 projects outward relative to the exterior 134 of the base 118 (see FIG. 9), such as by at least 1 mm. In some embodiments, the protruding finger tab 156 has a rigged exterior 158 intended to improve gripping and denote the presence and extent of the protruding finger tab 156.

In other contemplated embodiments, the protruding finger tab 156 includes release buttons that, when pressed, move the hooks 152 inward and out of alignment with the flanges 154, releasing the interlock 150 between the cap 114 and base 118 and allowing the cap 114 to be withdrawn from the passage 136 of the base 118 without interference from the interlock 150. In some embodiments, detaching the cap 114 includes simultaneously pinching together the release buttons on opposing surfaces of the adapter 112 (e.g., top and bottom surfaces).

According to an exemplary embodiment, the cap 116, as shown in FIG. 3, has a factory-fixed polarity or a secured polarity, as opposed to the cap 114 shown in FIG. 2. The port 128 of the cap 116 shown in FIG. 3 also includes major and minor dimensions $M_1$, $M_2$ and a single keyway 130, such that the port 128 of the cap 116 is configured to receive the same type of fiber optic connector as the port 128 of the cap 114 shown in FIG. 2 (e.g., standard MTP connectors). However, the cap 116 in FIG. 3, does not include protruding finger tabs 156 and/or a reverse chamfer on the hook 152, and is therefore is not releaseable and reengageable in the same manner as the cap 114 in FIG. 2. In some embodiments, the cap 116 is integrally formed with the base 118, adhered to the base 118, or otherwise permanently integrated with the base 118, and only the cap 114 is reversible. In other embodiments, both caps of an adapter are releaseable, reengageable, and reversible.

Referring now to FIGS. 10-16, an adapter 210, similar to the adapter 112, includes a cap 212 that snaps into or otherwise fastens to a base 214 (e.g., mating base adapter). In some embodiments, the adapter 210 meets the geometry requirements provided in FOCIS specification EIA-604-5A-2001. According to an exemplary embodiment, the cap 212 has a single keyway 216 (see FIGS. 12 and 16).

Figure 13:
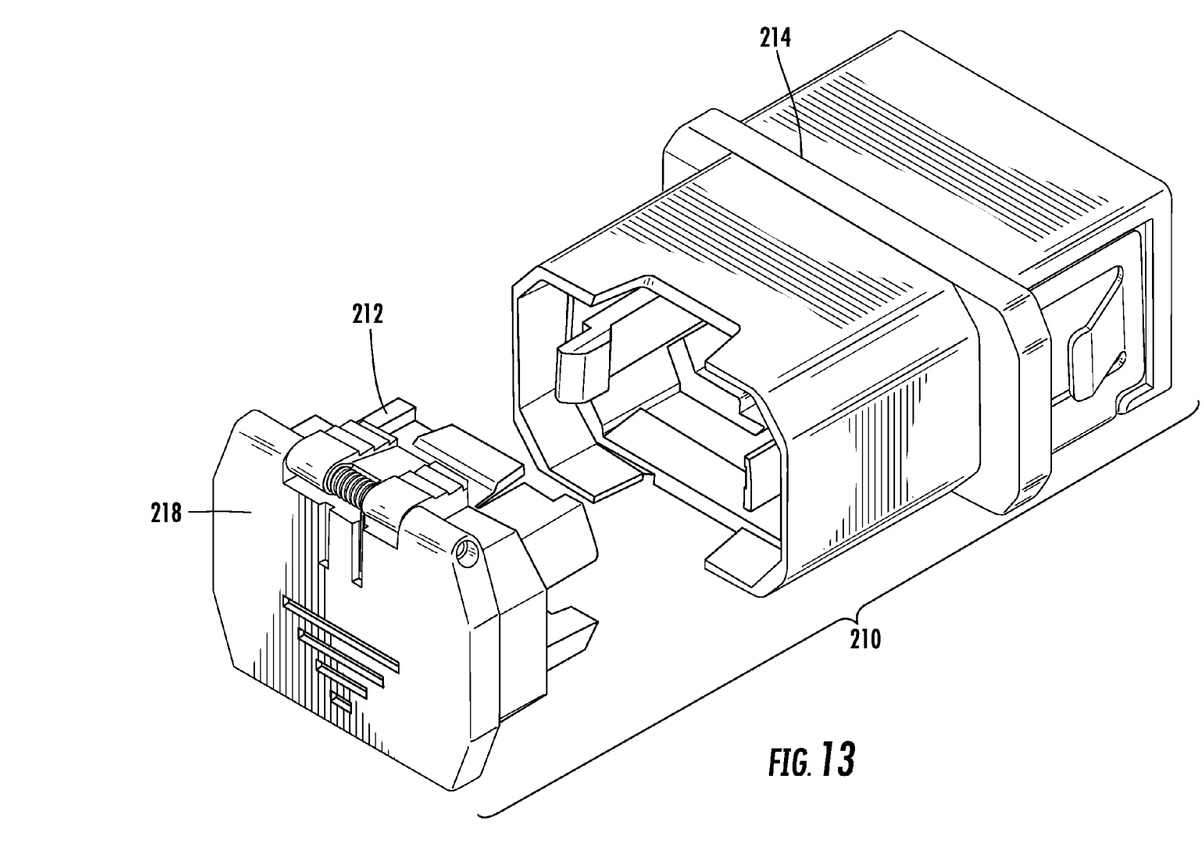
FIG. 13 is a perspective view of the adapter of FIG. 10 with the cap and shutter separated from the base.
Figure 14:
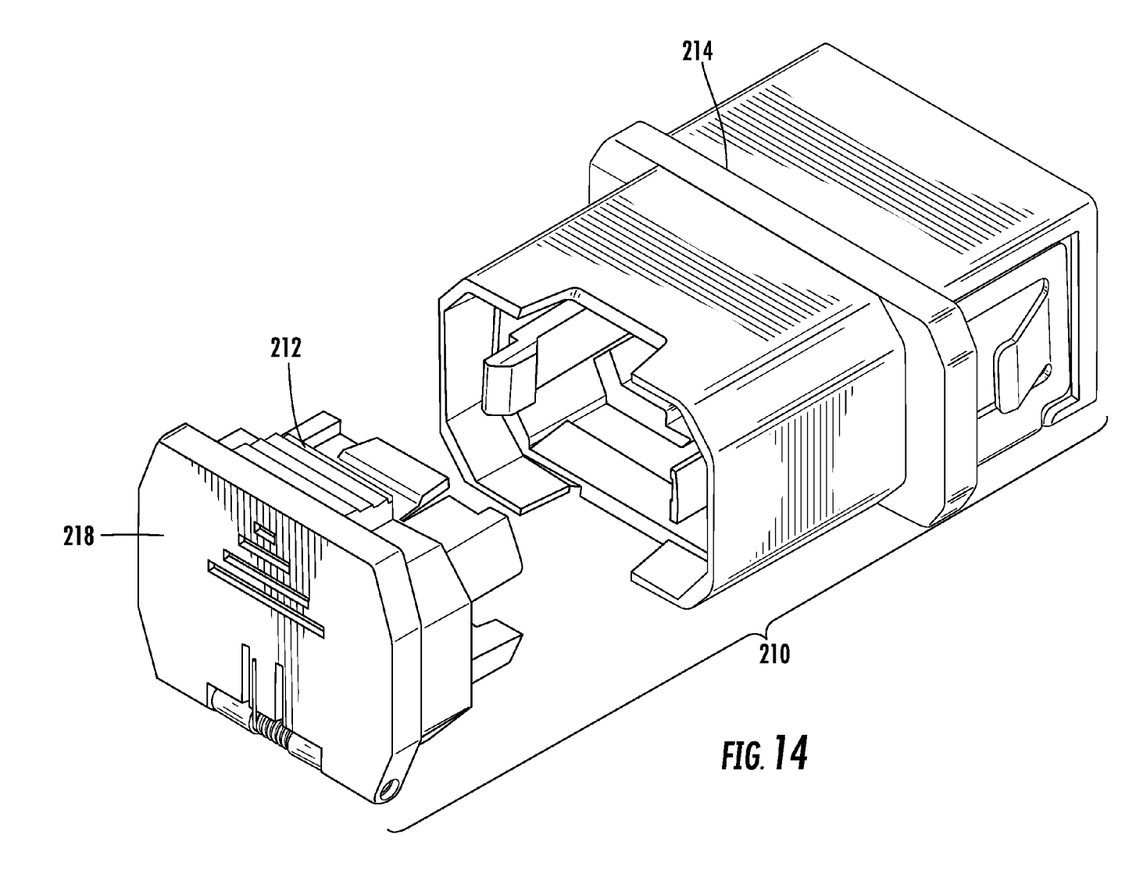
FIG. 14 is a perspective view of the adapter of FIG. 10 as shown in FIG. 13, but with the cap and shutter rotated 180-degrees relative to the base.

The cap 212 is removable by a technician and may be reversed when reinstalled into the base 214 (see FIGS. 13-14). Reversing the cap 212 upon reinstallation into the base 214 reverses the polarity of the adapter 210 (compare FIG. 12 and FIG. 16). In some embodiments, the cap 212 has a shutter 218 attached for dust protection. The shutter 218 of the adapter 210, in a reversed-polarity mode (FIGS. 15-16), is oppositely oriented relative to the shutter 218 in a standard polarity position (FIG. 10-12), which provides a visual indication to the technician of the polarity flip.

According to an exemplary embodiment, the cap 212 may be removed by hand if the cap 212 is manufactured with dual chamfered snap features (see, e.g., FIG. 9), or the cap 212 may be manufactured for permanent polarity assignment or added security that would require a tool for cap removal, such as being manufactured with a single-chamfer snap feature or other fastening system. Fixed polarity caps (e.g., cap 116 as shown in FIG. 3) may be fitted on the backplane of the adapter 210 and configured to fit into panels of fiber optic hardware (see, e.g., hardware 110 as shown in FIG. 1).

According to an exemplary embodiment, the cap is larger than a keyway blocker and does not necessitate a tool for insertion or removal. Incorporating a keyway (e.g., keyways 130, 216) with a single removable cap (e.g., caps 114, 212) allows a technician to reverse the polarity of an adapter (e.g., adapters 112, 210) in a manageable form factor that may be manipulated by average-sized fingers. The cap is approximately the same size and form factor as a dust cap, so the cap may be easier to hold onto and more difficult to loose than a keyway blocker. When equipped, the orientation of the shutter (e.g., shutters 120, 218) gives a clear indication to the technician and other operators that the polarity has been reversed or of the current polarity.

The adapters 112, 210 shown in the FIGURES are particularly configured for use with MTP connectors, but the adapter technology disclosed herein may also be generally applied to any multi-channels adapter. In some exemplary applications, utilizing the same footprint as modules, such as the Pretium EDGE® Solutions Module manufactured by CORNING CABLE SYSTEMS LLC for example, including two-, four-, or six-port ganged adapters, embodiments disclosed herein solve the polarity challenges that other ganged solutions do not address, while permitting the use of a shutter.

The construction and arrangements of the adapter, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A fiber optic connector adapter, comprising:
   a base comprising surfaces that define an exterior of the base and an interior passage between front and rear openings on opposing sides of the base;
   a cap fastened to the base over one of the front and rear openings,
   wherein the cap has a port for a fiber optic connector defined therein, wherein the port includes a major dimension extending along a first axis and a minor dimension extending along a second axis that is orthogonal to the first axis, wherein the minor dimension of the port is narrower than the major dimension,
   wherein the port includes only a single keyway, and wherein the keyway is:
      centered about the second axis on a side of the port defining the major dimension, offset from the first axis in a first direction, and
      defined by an interior groove on the side of the port defining the major dimension, wherein the interior groove extends in a direction orthogonal to the first and second axes and toward the passage of the base;
   an interlock between the base and the cap, which positions and holds the cap with the port of the cap oriented to interface with the passage of the base such that a fiber optic connector inserted into the port of the cap and guided by the keyway is directed to connect with a second fiber optic connector, with the connection therebetween having a standard polarity,
   wherein the interlock between the base and the cap is releaseable and reengageable, and wherein the cap is configured to be released from the base, rotated 180-degrees, and refastened to the base, via the interlock, having the keyway then offset from the first axis in a second direction that is opposite to the first direction, which positions and holds the cap with the port of the cap oriented to interface with the passage of the base such that a fiber optic connector inserted into the port of the cap and guided by the keyway is then directed to connect with a second fiber optic connector, with the connection therebetween having a reverse polarity.

2. The adapter of claim 1, wherein the base comprises a female coupling and wherein the cap comprises a male coupling configured to connect with the female coupling to form the interlock.

3. The adapter of claim 1, wherein the cap is fastened to the interior of the base.

4. The adapter of claim 3, wherein the cap snaps into the base to form the interlock.

5. The adapter of claim 4, wherein the cap comprises hooks and the base comprises flanges within the passage, which together at least partially form the interlock; and
   wherein, upon insertion of the hooks passing the flanges, the hooks deflect inward and then recover outward once past the flanges such that the hooks interlock with the flanges.

6. The adapter of claim 5, wherein the cap comprises finger tabs that protrude from the top of the adapter and provide a gripping surface for moving the hooks inward and out of alignment with the flanges, releasing the interlock between the cap and base and allowing the cap to be withdrawn from the passage of the base without interference from the interlock.

7. The adapter of claim 6, wherein the finger tabs project outward relative to the exterior of the base by at least 1 mm.

8. The adapter of claim 1, further comprising a shutter pivotally coupled to the cap, wherein the shutter in a closed-position blocks the port.

9. The adapter of claim 8, wherein the shutter is coupled to the cap adjacent to the keyway on the side of the port defining the major dimension, whereby the shutter opens in opposite directions for the different polarities of the adapter, thereby providing an indication of the polarity of the adapter.

10. The adapter of claim 8, wherein the shutter comprises indicia on a face of the shutter, wherein the indicia is asymmetric and the orientation of the indicia corresponds with the polarity of the adapter.

11. The adapter of claim 1, wherein the cap is a first cap;
   wherein the adapter further comprises a second cap fastened to the base over the other of the front and rear openings and having a port for a fiber optic connector defined therein, wherein the port of the second cap includes major and minor dimensions and a single keyway such that the port of the second cap is configured to receive the same type of fiber optic connector as the port of the first cap; and
   wherein the second cap is not releaseable and reengageable like the first cap.

12. Hardware for management of fiber optic assemblies, comprising:
   a panel comprising:
      a planar surface for supporting the fiber optic assemblies, and
      guide walls extending orthogonally from the planar surface; and
   a gang of fiber optic connector adapters, as defined in claim 1, fastened to the panel.

13. The hardware of claim 12, wherein the gang comprises at least six of the fiber optic connector adapters.

14. The hardware of claim 13, wherein the base corresponding to the fiber optic connector adapters of the gang includes a single, solid component that is integrally formed from a polymeric material and receives the caps of the fiber optic connector adapters.

15. The hardware of claim 14, wherein the gang of fiber optic connector adapters is fastened to a front of the panel with the ports of the caps orthogonal to the planar surface.

16. The hardware of claim 15, wherein the base snaps into panel.

17. Method of reversing the polarity of a fiber optic connector adapter, comprising steps of:
   accessing a fiber optic connector adapter as defined in claim 1, wherein the fiber optic connector adapter has a standard polarity;
   detaching the cap from the base;
   rotating the cap 180-degrees relative to the base; and
   reengaging the cap with the base, wherein the fiber optic connector adapter then has a reverse polarity.

18. The method of claim 17, wherein the cap comprises hooks and the base comprises flanges within the passage, which together at least partially form the interlock; and wherein, upon insertion of the hooks passing the flanges, the hooks deflect inward and then recover outward once past the flanges such that the hooks interlock with the flanges;
   wherein the cap comprises release buttons that, when pressed, move the hooks inward and out of alignment with the flanges, releasing the interlock between the cap and base and allowing the cap to be withdrawn from the passage of the base without interference from the interlock,
   wherein the step of detaching further comprises pinching the release buttons together to release the interlock.

19. The method of claim 17, wherein the fiber optic connector adapter further comprises a shutter pivotally coupled to the cap, wherein the shutter in a closed-position blocks the port,
   wherein the shutter is coupled to the cap on the side of the port defining the major dimension and adjacent to the keyway, and
   wherein the step of rotating further comprises rotating the shutter, whereby the shutter opens in opposite directions for the different polarities of the adapter, thereby providing an indication of the polarity of the adapter.

20. The method of claim 17, wherein the fiber optic connector adapter further comprises a shutter pivotally coupled to the cap, wherein the shutter in a closed-position blocks the port,
   wherein the shutter comprises indicia on a face of the shutter, wherein the indicia is asymmetric and the orientation of the indicia corresponds with the polarity of the adapter; and
   wherein the step of rotating further comprises rotating the indicia, thereby providing an indication of the polarity of the adapter.

* * * * *